United States Patent [19]

Hohwiller

[11] 4,245,054

[45] Jan. 13, 1981

[54] PROCESS FOR THE MANUFACTURE OF A DRY MIXTURE FOR INSULATING STUCCO OR PLASTER

[75] Inventor: Frieder Hohwiller, Bad Durkheim, Fed. Rep. of Germany

[73] Assignee: BASF Aktiengesellschaft, Ludwigshafen, Fed. Rep. of Germany

[21] Appl. No.: 103,839

[22] Filed: Dec. 12, 1979

[30] Foreign Application Priority Data

Dec. 19, 1978 [DE] Fed. Rep. of Germany ....... 2854755

[51] Int. Cl.$^3$ .............................................. C08J 9/22
[52] U.S. Cl. ..................... 521/55; 427/222; 521/57; 521/84
[58] Field of Search .................... 521/55, 57; 427/222

[56] References Cited

U.S. PATENT DOCUMENTS

| | | | |
|---|---|---|---|
| 3,214,393 | 10/1965 | Sefton | 521/55 |
| 3,247,295 | 4/1966 | Sabouni | 521/55 |
| 3,257,338 | 6/1966 | Sefton | 521/55 |
| 3,272,765 | 9/1966 | Sefton | 521/55 |
| 3,338,848 | 8/1967 | Hamilton | 521/55 |
| 3,705,116 | 12/1972 | Vargin et al. | 521/55 |
| 3,705,117 | 12/1972 | Vargin et al. | 521/55 |
| 3,711,431 | 1/1973 | Vargin et al. | 521/55 |
| 3,869,295 | 3/1975 | Bowles et al. | 521/55 |
| 3,899,455 | 8/1975 | Unlersteubofer et al. | 521/55 |
| 4,040,855 | 8/1977 | Rody-Pentek et al. | 521/55 |

*Primary Examiner*—Morton Foelak
*Attorney, Agent, or Firm*—Norbert M. Lisicki; Joseph D. Michaels

[57] ABSTRACT

A process for the manufacture of a thermally insulating light stucco or plaster mixture which consists of expanded polystyrene particles coated with an aqueous solution of methyl cellulose in addition to cement, wall binder and dispersion powders.

1 Claim, No Drawings

PROCESS FOR THE MANUFACTURE OF A DRY MIXTURE FOR INSULATING STUCCO OR PLASTER

In the manufacture of thermally-insulating light stucco or plaster mixtures, light additives which completely or predominantly consist of expanded polystyrene particles are employed. These mixtures are conveniently produced as dry mixtures in which the foam additive, the hydraulic binders and other additives are uniformly mixed and packed. At the construction site, the dry mixture is prepared with water and processed.

Generally, the expanded polystyrene additives are used in the form of round particles. As a result of their statically favorable round ring form and their elastic behavior, these particles can absorb the pressure incurred in transport and during automatic processing (spraying) of the stucco mixture without excessive volume losses. However, the bead shape and the smooth particle surface are disadvantageous insofar as the dry mixture tends towards a separation of the light additive, thus rendering uniform binder distribution impossible and causing disturbing box density and stability variations.

The purpose of this invention was the development of a process for the manufacture of a dry mixture for insulating stucco where predominantly round, expanded polystyrene particles are used without incurring the above-mentioned separation of the expanded additive and their resulting disadvantages.

According to this invention, this problem is solved by having the foam particles wetted by an adhesive solution of aqueous methyl cellulose during the preparation of the dry stucco mixture so that part of the binder adheres to the particle surface during the subsequent admixture of the binding agent. Care must be taken that the amount of adhesive does not exceed 15 cubic decimeters per 1 cubic decimeter of expanded polystyrene in order that only approximately 20 percent of the binder component adheres to the particle surface and that the residual binder contained in the dry stucco mixture does not come in contact with the adhesive. This is achieved when the amount of methyl cellulose is 1 to 4 percent by weight based on the weight of the expanded polystyrene.

For the manufacture of light expanded polystyrene concrete, it is recommended that the foam additive is coated with a tacky substance in order to guarantee that the cement coats the foam particles in a uniformly thick binding layer during the subsequent mixing process so that a relatively high breaking strength is achieved by means of the arch effect of the concrete structure after hardening (Concrete Stone Journal 1968, No. 2, pages 81-87; No. 3, pages 133-137). In the same publication, the alternate possibility is described of coating foam particles with a cement mortar skin in a separate mixing process to harden these particles and to further process this mixture as a light additive at the construction site.

In German Application No. 18 03 381, the use of 5 to 20 parts by weight of foam particles based on polystyrene with a bulk density of 80 to 300 kilograms per cubic meter coated with ground volcanic tough stone for insulating mortar and insulating stucco is recommended.

The process according to the instant invention differs from the usual mode of operation in that stucco and wall binders or mixed binders, primarily based on limestone, are used as binders suitable for the production of stucco according to DIN No. 18550 and that the foam additives are wetted with the adhesive in one operation during the processing of the dry stucco mixture.

Another dissimilarity to the prior art described modes of operation, lies in the fact that the foam particles, according to the process of the instant invention, are not coated with a thick binder skin, but that only a binder agglomerate adheres to the particle surface. This results in a major part of the binder not being hydrated and thus, is available for bonding during the processing at the construction site. If the foam particles were completely coated, the adhering binder would hydrate by removing water from the adhesive and would be lost for the hardening process of the completed stucco mixture which would result in loss of strength.

Surprisingly, it was found that round, expanded polystyrene particles, particularly those having a bulk density of 10 to 15 kilograms per cubic meter, can be prepared in such a manner using the process of the instant invention, that they can be mixed dry with binders and additives of considerably higher density and can be delivered without separation occurring of the light foam additives.

The following example illustrates the nature of the invention.

EXAMPLE

A dry stucco mixture having the following composition:

|  |  | % by Weight |
|---|---|---|
| 1. | Expanded polystyrene particles Bulk density 12 kilograms per cubic meter Particle diameter 0.5 to 4.0 millimeters | 3.4 |
| 2. | Stucco and wall binder according to DIN 4211 | 70.0 |
| 3. | Cement according to DIN 1164 | 22.4 |
| 4. | Methyl cellulose as 2.5% aqueous solution | 2.8 |
| 5. | Redispersible dispersion powder based on vinyl acetate-ethylene copolymer | 1.1 |
| 6. | Highly dispersed silicic acid | 0.3 | was processed as follows:

The expanded polystyrene particles are initially metered into the mixer followed by the aqueous methyl cellulose adhesive (mixing time approximately 60 seconds). This is followed by the addition of the hydraulic binders and the other additives, allowing an after-mixing period of approximately 30 seconds. This results in a pourable, clump-free, dry stucco mixture with uniform binder distribution with the binder partially adhering to the particle surface. The dry mixture can be bagged using familiar bagging devices or can be shipped in silo trucks.

The stucco and mortar binders according to DIN 4211 may also be replaced by mixed binders predominantly based on limestone.

The material can be processed without any problem at the construction site adding water and using any commonly used continuous or batch-type stucco spraying equipment. The bulk density variations in the dry mixture are very low, which are indicated by the following comparison test:

In a 120-liter vessel with diagonal discharge chute, the respective mixture is shaken [mixed] for 15 seconds and is subsequently transferred in a five-liter vessel with the bulk density variations being determined by weight. The test shows that the mixture, with a scattering range of 75 kilograms per cubic meter according to the instant invention, has considerably lower bulk density variations than a mixture prepared in this same manner with untreated foam particles which showed a scattering range of 198 kilograms per cubic meter with an average bulk density of 260 kilograms per cubic meter.

The embodiments of the invention in which an exclusive privilege or property is claimed are defined as follows:

1. In a process for the manufacture of a dry plaster or stucco mixture for thermal insulation consisting of foamed polystyrene particles, cement, hydraulic binders and dispersing agents, the improvement comprises coating said foamed polystyrene particles with 1 to 4% by weight of methyl cellulose, based on the weight of foamed polystyrene.

* * * * *